Jan. 13, 1925.

R. F. BERAN 1,523,376

SPRING CLIP

Filed July 3, 1924

Inventor
Rudolph F. Beran,

By

Attorney

Patented Jan. 13, 1925.

1,523,376

UNITED STATES PATENT OFFICE.

RUDOLPH F. BERAN, OF BRENHAM, TEXAS.

SPRING CLIP.

Application filed July 3, 1924. Serial No. 724,106.

*To all whom it may concern:*

Be it known that I, RUDOLPH F. BERAN, a citizen of the United States, residing at Brenham, in the county of Washington, State of Texas, have invented certain new and useful Improvements in Spring Clips; and I do hereby declare the following to be a full, clear, and exact description of the invention, such as will enable others skilled in the art to which it appertains to make and use the same.

This invention relates to automobile devices, and particularly to spring clips.

In certain types of automobiles now on the market, the means for securing the spring to the rear axle includes U-bolts engaged over the axle and with the ends of its legs disposed through a plate arranged beneath the spring. These lower ends of the arms of the bolts often strike obstructions in a road, causing damage to the automobile, and also rendering it difficult to remove the automobile, especially in the event that the road is composed of deep mud.

It is the particular object of this invention to provide a clip for supporting the spring beneath the rear axle, whereby the bolt ends will lie above the bottom of the spring, thus preventing said ends catching on any obstruction.

Other objects and advantages will be apparent from the following description when taken in connection with the accompanying drawing.

In the drawing:

Figure 2 is a vertical transverse sectional view on the line 2—2 of Figure 1.

Figure 3 is a perspective view of the clip.

Figure 1:
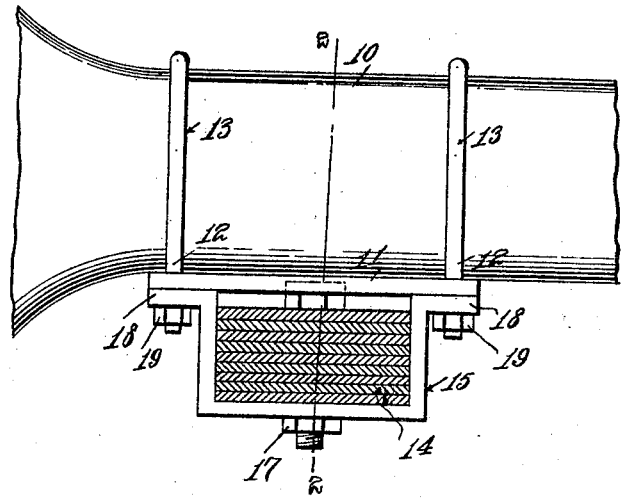
Figure 1 is an elevation of a portion of the rear axle of an automobile, showing the spring clip applied thereto, the spring being in section.
Figure 1:
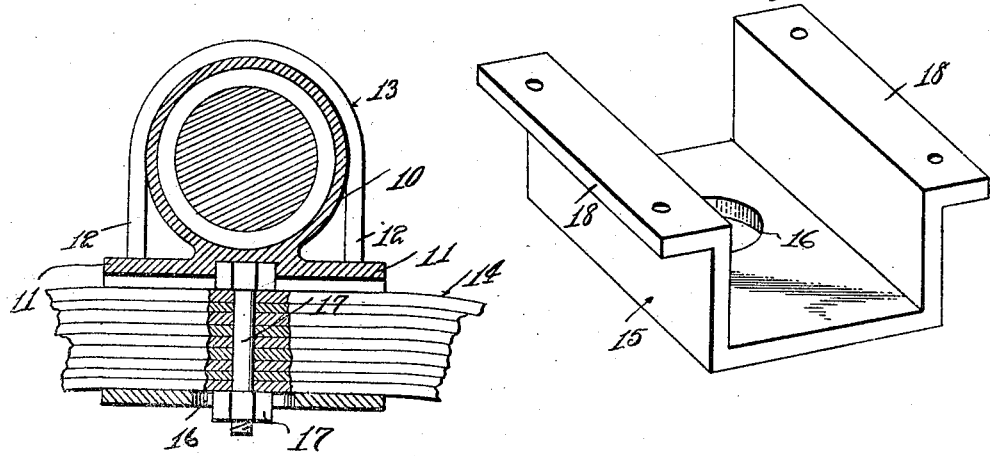

Referring particularly to the accompanying drawing, 10 represents a portion of the rear axle housing of an automobile, in connection with which the present invention is used, said housing portion having forwardly and rearwardly extending flanges 11 for the passage therethrough of the legs 12, of the U-bolts 13, which are disposed in straddling relation over the said housing portion. The lower faces of the flanges are flat and lie in a plane which is tangential to the lower side of the housing portion, and against these portions of the flanges the upper face of the intermediate portion of the spring 14 is disposed. Embracing this intermediate portion of the said spring 14, in supporting relation thereto, and maintaining same in engagement with the lower faces of the flanges 11, is an angular U-shaped clip 15. The center of the bottom wall of the channel of the clip is formed with an opening 16 to receive the bolt 17 of the spring, while the upper ends of the side walls of the clip are formed with laterally extending flanges 18 which also receive the lower ends of the legs of the bolts 13. Nuts 19 are engaged on the bolt legs, against the lower faces of the flanges 18.

In the certain types of automobiles above referred to, the ends of the U-bolts 13 extend downwardly below the lower face of the spring 14, with the result that there is danger of these bolts striking an obstruction in a road, and breaking off, whereupon the spring becomes detached from the axle housing. By means of the present construction these bolt ends are elevated to a distance above the bottom of the spring as to render them safe from obstructions.

The present clip is of simple construction and can be readily and easily applied to the spring and axle without modification of either.

What is claimed is:

1. The combination with the axle housing and spring of a vehicle, of a member disposed beneath the axle housing and receiving a portion of the spring therein, and means for securing said member to said housing.

2. The combination with the axle housing and spring of a vehicle, of a channeled member beneath said housing and receiving the spring in the channel thereof, and fastening means embracing the housing and connected with the channeled member above the plane of the bottom of said member.

3. The combination with the axle housing and spring of a vehicle, of a channeled member disposed beneath the housing and receiving the intermediate portion of the spring therein, the upper ends of the side wall of said channeled member having laterally directed apertured flanges, and securing bolts engaged with the housing and having their ends secured within the said flanges.

In testimony whereof, I affix my signature, in the presence of two witnesses.

RUDOLPH F. BERAN.

Witnesses:
 WALLACE F. KASPRONIG,
 PAUL A. WITTNER.